(12) United States Patent
Yabe

(10) Patent No.: US 8,773,718 B2
(45) Date of Patent: Jul. 8, 2014

(54) IMAGE PROCESSING APPARATUS, IMAGE PROCESSING METHOD, AND STORAGE MEDIUM FOR MEASURING LINE WIDTH OF LINES

(71) Applicant: Canon Kabushiki Kaisha, Tokyo (JP)

(72) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 13/717,039

(22) Filed: Dec. 17, 2012

(65) Prior Publication Data

US 2013/0155430 A1   Jun. 20, 2013

(30) Foreign Application Priority Data

Dec. 19, 2011   (JP) .................................. 2011-277324

(51) Int. Cl.
*G06K 15/02* (2006.01)
*G06K 9/46* (2006.01)

(52) U.S. Cl.
USPC ............................. 358/1.9; 382/193; 382/194

(58) Field of Classification Search
USPC .................................... 358/1.9; 382/193, 194
See application file for complete search history.

(56) References Cited

U.S. PATENT DOCUMENTS 8,287,079 B2 * 10/2012 Yamazaki ........................ 347/19
2012/0082388 A1 * 4/2012 Enomoto et al. ............... 382/203
2012/0263355 A1 * 10/2012 Monden ........................ 382/124

FOREIGN PATENT DOCUMENTS

JP      11-108631 A     4/1999

* cited by examiner

*Primary Examiner* — Charlotte M Baker
(74) *Attorney, Agent, or Firm* — Canon USA Inc. IP Division

(57) ABSTRACT

A line width is derived based on the number of black pixels counted in an area set so that in a case where a first line width is finer than a second line width, the area for the lines having a first line width is set larger than for the lines having a second line width.

7 Claims, 21 Drawing Sheets

FIG. 7

| ORIGINAL LINE WIDTH | | LINE WIDTH TARGET | | | | |
|---|---|---|---|---|---|---|
| PIXEL WIDTH | WIDTH | FINE | SLIGHTLY FINE | STANDARD (INITIAL VALUE) | SLIGHTLY THICK | THICK |
| 1 | 40 | 10 | 20 | 40 | 60 | 80 |
| 2 | 80 | 40 | 60 | 80 | 100 | 120 |
| 3 | 120 | 80 | 100 | 120 | 140 | 160 |
| 4 | 160 | 120 | 140 | 160 | 180 | 200 |

FIG. 10

```
LINE WIDTH CORRECTION

· APPLY AUTOMATIC CORRECTION?

MEASUREMENT
         LINE WIDTH TARGET       MEASUREMENT        WIDTH AFTER
              STANDARD              WIDTH           CORRECTION

ONE-PIXEL WIDTH LINE   (40 μm)     22 μm            42 μm
  TWO-PIXEL WIDTH LINE   (80 μm)     96 μm            76 μm
  THREE-PIXEL WIDTH LINE (120 μm)   145 μm           125 μm
  FOUR-PIXEL WIDTH LINE  (160 μm)   184 μm           164 μm ( APPLY )              ( NOT APPLY )
            |                        |
           1101                     1102
```

FIG. 16

| PIXEL WIDTH | TARGET LINE WIDTH (μm) | COUNT AREA | ONE-PIXEL COUNT NUMBER | BLACK PIXEL COUNT NUMBER | MEASUREMENT WIDTH (μm) | CORRECTION LEVEL | MEASUREMENT WIDTH AFTER CORRECTION (μm) |
|---|---|---|---|---|---|---|---|
| n | Wt(n) | Area(n) | C(n) | BK(n) | W(n) | Lc(n) | Wa(n) |
| 1 | 40 | 50×10 | 50 | 27 | 22 | 1 | 42 |
| 2 | 80 | 25×10 | 25 | 60 | 96 | −1 | 76 |
| 3 | 120 | 25×10 | 25 | 91 | 145 | −1 | 125 |
| 4 | 160 | 10×10 | 10 | 46 | 184 | −1 | 164 |

CORRECTION LEVEL
(-2)

CORRECTION LEVEL
(-1)

CORRECTION LEVEL
(0)

CORRECTION LEVEL
(+1)

CORRECTION LEVEL
(+2)

IMAGE PROCESSING APPARATUS, IMAGE PROCESSING METHOD, AND STORAGE MEDIUM FOR MEASURING LINE WIDTH OF LINES

BACKGROUND OF THE INVENTION

1. Field of the Invention

The present disclosure generally relates to image processing and, more particularly, to a technology for measuring line width of lines.

2. Description of the Related Art

When an image forming apparatus that employs an electrophotographic process is used for a long time, characteristics of units in the image forming apparatus change, and compared with an initial period, the lines to be printed (especially fine lines, which are thin lines) can become more fine. Therefore, technology exists to correct the line width of the lines to be printed. In this technology, a line width correction amount is determined by measuring the line width of a line to be printed by the image forming apparatus. Japanese Patent Application Laid-Open No. 11-108631 discusses a technology for measuring the line width of printed lines based on an image of lines read from a printed product in which lines have been printed. In this technology, the number of black pixels forming the line image is counted for a predetermined area including the read line image, and the line width is determined based on the sum of counted pixels.

As in the technology discussed in Japanese Patent Application Laid-Open No. 11-108631, processing can be speeded up more than when the number of black pixels is counted for the whole area of the line image.

To count the number of black pixels, each pixel in the image is binarized into black pixels and white pixels by comparing a pixel value with a threshold. In this case, the pixel value of the pixels may or may not exceed the threshold due to blur of the image during printing. Thus, a pixel can sometimes be a white pixel and sometimes a black pixel, so that the pixel is uncertain.

Since the technology discussed in Japanese Patent Application Laid-Open No. 11-108631 does not give any consideration to the degree of blur in the image, the number of pixels counted in the predetermined area can be less than the number of pixels indicated by the actual line width. Further, the finer the line width is, the greater the number of pixels is affected due to this image blur.

Specifically, for example, if an image of a line printed at a 4-pixel width, which is not affected much by blur, is binarized and the black pixels counted, since the degree of blur is small, the number of black pixels counted after the binarization does not decrease by that much. Consequently, the line width determined based on the number of black pixels is roughly equal to the actual line width.

However, if an image of a line printed at a 1-pixel width, which is more easily affected by blur, is binarized and the black pixels counted, since the number of pixels that happen to undergo white pixelation can increase from the binarization, the number of counted black pixels decreases. Consequently, the line width determined based on the counted number of black pixels is narrower than the actual line width.

SUMMARY OF THE INVENTION

The present disclosure is directed to enabling line width to be measured in consideration of the influence of blur based on line width.

According to an aspect of the present disclosure, an image processing apparatus includes a printing unit configured to print an image with lines having a first line width and an image with lines having a second line width on a sheet, and output a printed product, a reading unit configured to acquire a read image by reading the printed product, a binarization unit configured to generate a binarization image by performing black pixelation on pixels corresponding to each of the lines in the read image by performing binarization processing on the read image using a predetermined threshold, an area setting unit configured to set an area with a size based on the line width of each of the lines for each of the lines in the binarization image, a counting unit configured to count a number of black pixels corresponding to each of the lines in the binarization image in the area set for each of the line widths; and a derivation unit configured to derive the line width of the lines on the printed product based on the number of black pixels counted by the counting unit, wherein in a case where the first line width is finer than the second line width, the size of the area set for the first line width by the area setting unit is larger than the size of the area set for the second line width by the area setting unit.

According to the present disclosure, because the area for counting pixels is increased, line width can be more accurately measured while giving consideration to the degree of blur based on line width.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIG. 7 illustrates a target line width conversion table.

FIG. 10 illustrates an example of an application confirmation screen.

FIG. 16 illustrates an example of various data determined by line width correction value calculation processing.

DESCRIPTION OF THE EMBODIMENTS

Various exemplary embodiments, features, and aspects of the disclosure will be described in detail below with reference to the drawings.

Figure 1:
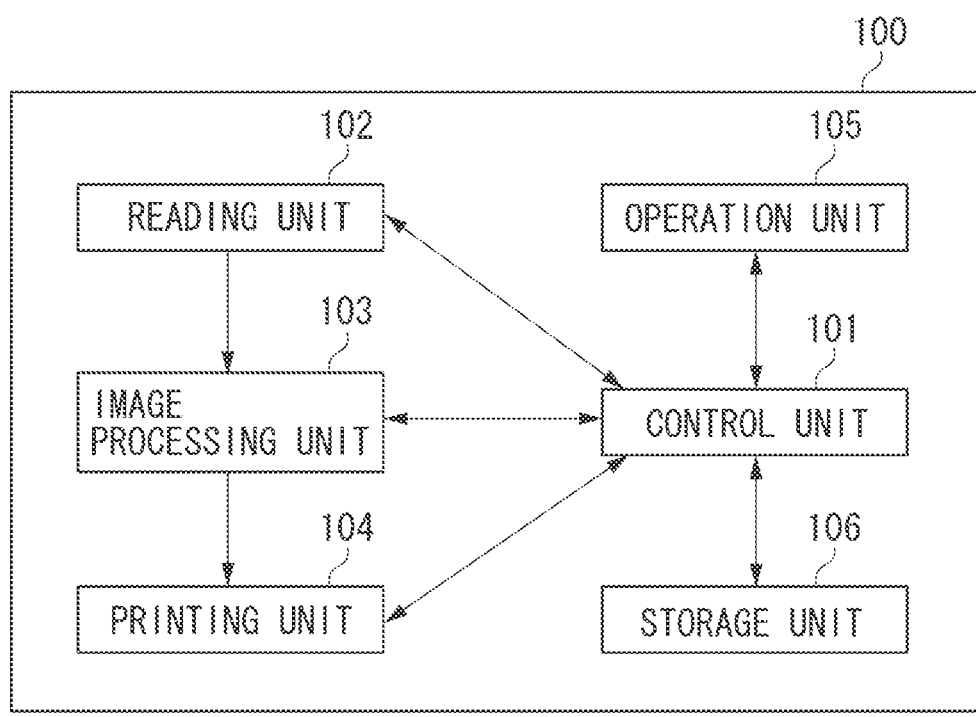
FIG. 1 illustrates an example of a hardware configuration of an image processing apparatus.

A first exemplary embodiment will now be described. FIG. 1 illustrates an example of a hardware configuration of a multifunction peripheral (MFP) 100, which is an image processing apparatus according to the present exemplary embodiment. The MFP 100 includes a control unit 101, a reading unit 102, an image processing unit 103, a printing unit 104, an operation unit 105, and a storage unit 106.

The control unit 101 includes a (not illustrated) central processing unit (CPU), a read-only memory (ROM), and a random access memory (RAM). By operating these units in a coordinated manner, the control unit 101 functions as a control unit that controls the various processing units 102 to 106. Further, the control unit 101 controls the overall operation of the MFP 100 in an integrated manner.

The reading unit 102 acquires a read image by reading a printed product printed with lines in various line widths for measuring line width.

The image processing unit 103 generates image data for printing by performing various image processing processes, such as screen processing and line width correction on the image data to be printed.

The printing unit 104 performs image formation with a development agent (toner) on a sheet (a recording medium such as high-quality paper, recycled paper or an overhead projector (OHP) sheet) based on the image data for printing generated by the image processing unit 103, and outputs the printed product. In the present exemplary embodiment, high-quality paper is used for the sheet.

The operation unit 105 is a user interface for sending various information to the control unit 101 based on user instructions.

The storage unit 106 stores the image data of images read by the reading unit 102. The storage unit 106 is a unit that is used in reading and analysis processing performed based on controls by the control unit 101. Additionally, the storage unit 106 stores the image data for measurement used for measuring line width. Further, the storage unit 106 stores the computer programs for executing the series of processes illustrated in the below flowcharts of FIGS. 3 and 5.

Figure 2:
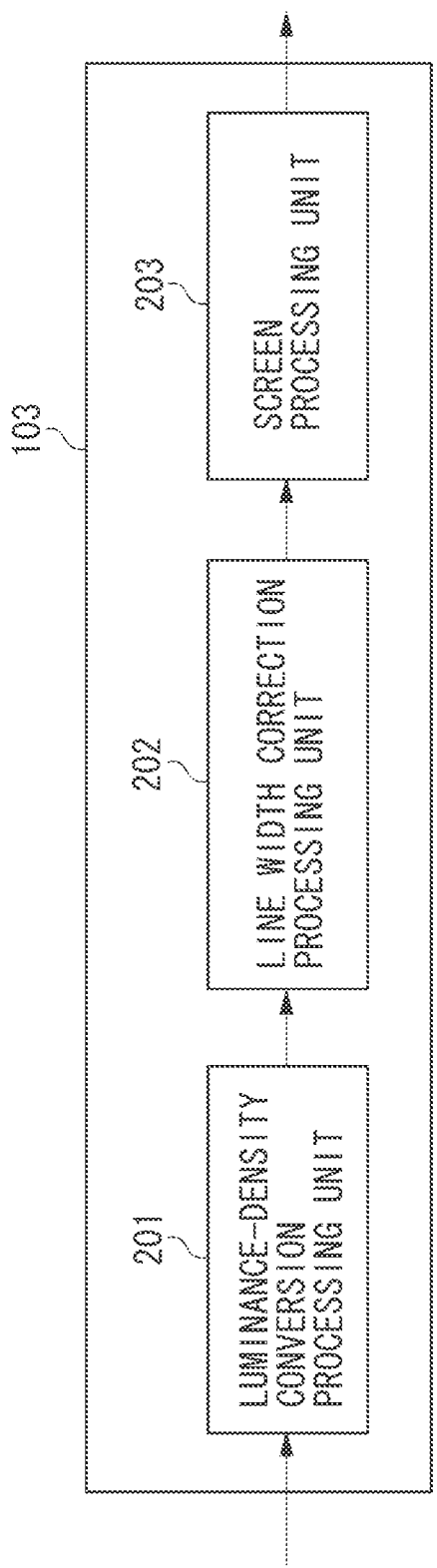
FIG. 2 illustrates an example of an image processing unit configuration.

The image processing unit will now be described. FIG. 2 illustrates an example of the configuration of the image processing unit 103.

The image processing unit 103 includes a luminance-density conversion processing unit 201, a line width correction processing unit 202, and a screen processing unit 203.

If the image data is luminance data, the luminance-density conversion processing unit 201 converts the image data from luminance into density, and outputs the image data to the line width correction processing unit 202. If the image data is density data, the luminance-density conversion processing unit 201 outputs to the line width correction processing unit 202 the image data as density data as is.

The line width correction processing unit 202 detects a line portion in the image data, determines the line width of that line, and based on a line width correction value stored in the (not illustrated) RAM of the control unit 101, corrects the line width of the line in the image data. Then, the line width correction processing unit 202 outputs the corrected image data to the screen processing unit 203.

The screen processing unit 203 performs screen processing on multi-value image data to enable the printing unit 104 to print the multi-value image data. For example, the screen processing unit 203 performs binary screening. Further, the screen processing unit 203 outputs the screen processed image data as image data for printing to the printing unit 104.

Figure 3:
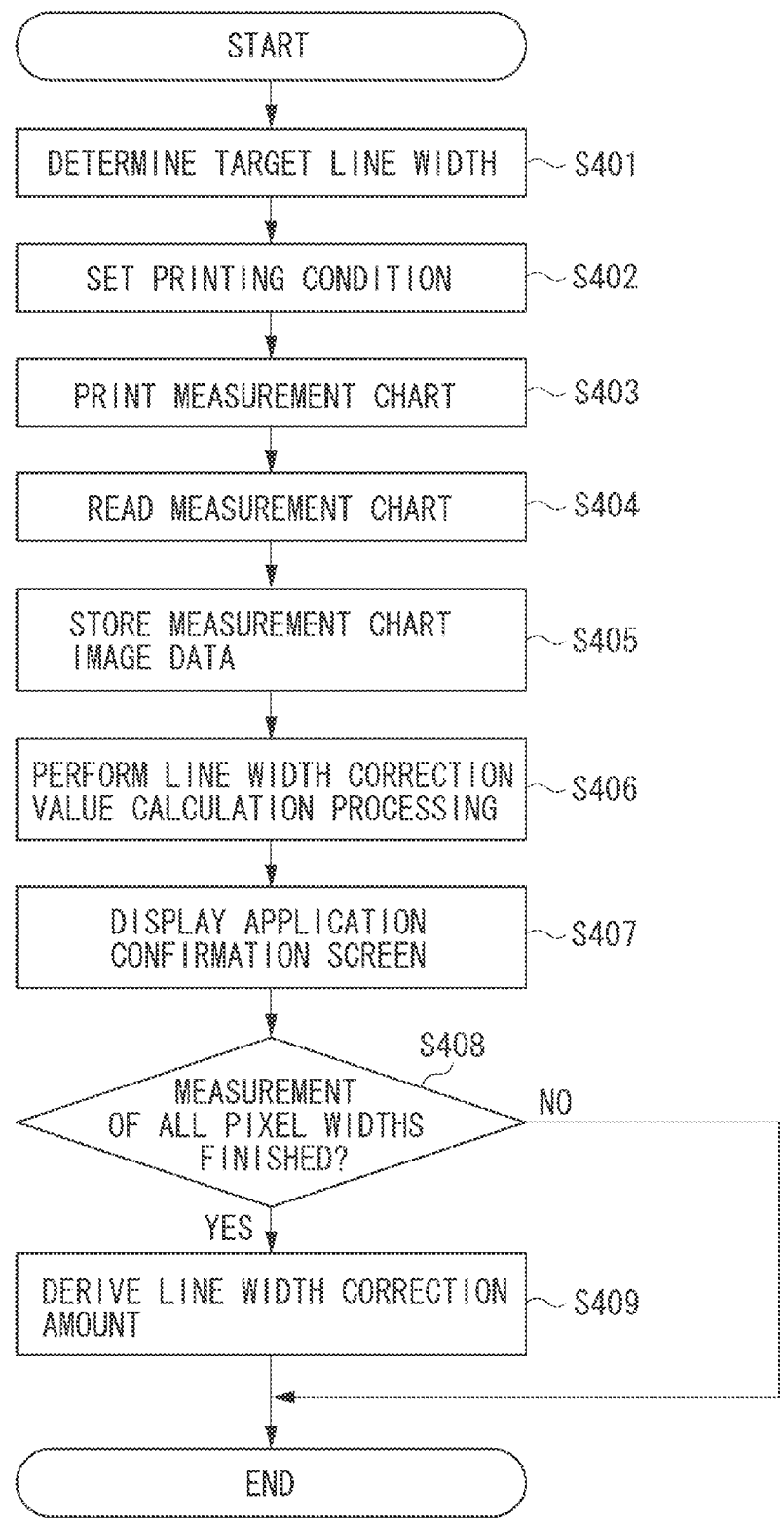
FIG. 3 is a flowchart illustrating a processing flow in line width automatic correction processing.

Line width automatic correction will now be described. The flowchart of FIG. 3 illustrates a series of processes for automatic correction of line width that are executed by the control unit 101 controlling the various processing units. Specifically, the series of processes illustrated in FIG. 3 is realized by the CPU in the control unit 101 reading a program for executing the flowchart of FIG. 3 from the storage unit 106, loading the read program into the RAM, and executing the program. Further, the processing illustrated in the flowchart of FIG. 3 is realized when a command to execute automatic correction of line width is sent by the operation unit 105 to the control unit 101 based on a user instruction, and this execution command is received by the control unit 101. The flowchart of FIG. 3 will now be described.

In step S401, the control unit 101 sets the target line width at the time of auto correction.

Figure 6:
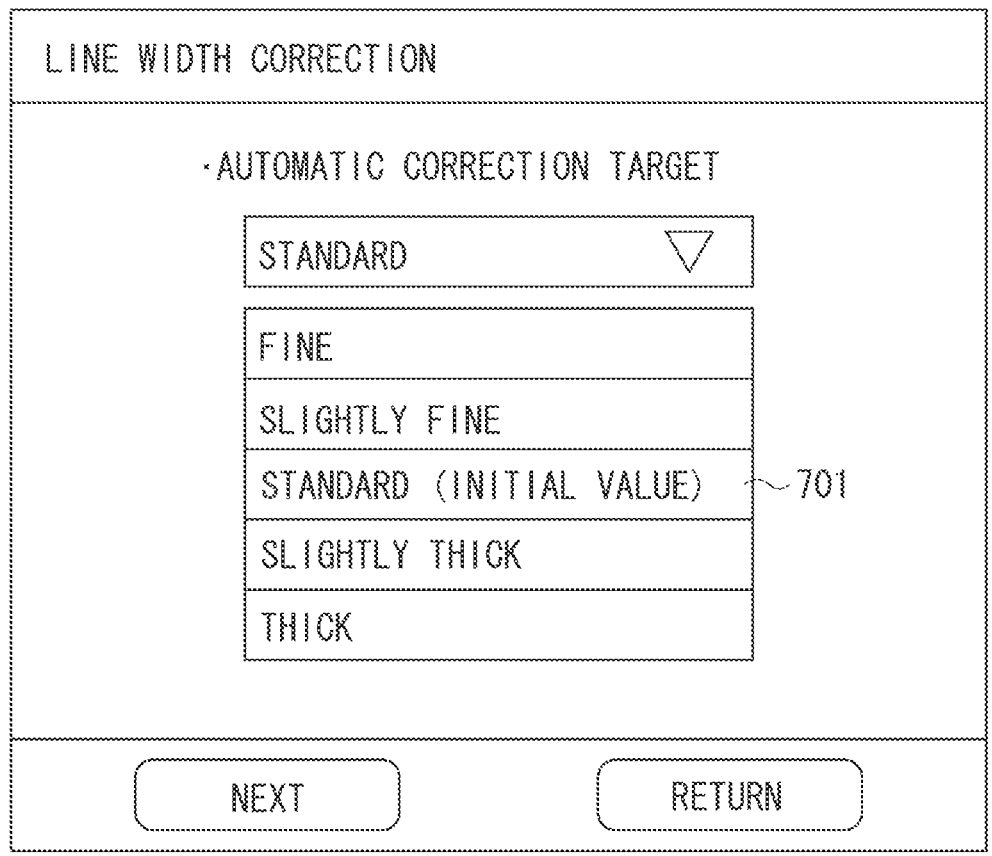
FIG. 6 illustrates an example of a target setting screen.

The control unit 101 causes the operation unit 105 to display a target setting screen like that illustrated in FIG. 6. The user selects from within this screen a desired target, and operates the operation unit 105. Then, the operation unit 105 sends information about the target specified by the user to the control unit 101.

This automatic correction target indicates the tendency of the line width set as the target when correcting line width. For example, if the user specified "thick", the corrected line width will be thicker than when "standard (initial value)" is specified. In the present exemplary embodiment, a case will now be described in which the user specified "standard (initial value)" 701 as the information for the target.

The control unit 101 receives the information indicating the automatic correction target specified by the user, and determines the target line width based on the information indicating the target by referring to the conversion table illustrated in FIG. 7 that is pre-stored in the storage unit 106. FIG. 7 illustrates a table for determining the line width (target line width) that will serve as the correction target for lines with each pixel width. Specifically, the control unit 101 refers to the row of the information indicating the target in the conversion table illustrated in FIG. 7, and determines the value in this row as the target line width corresponding to the lines with each pixel width.

For example, the control unit 101 receives from the operation unit 105 information indicating that "standard (initial value)" 701 has been specified, and determines the line width (target line width) that will serve as the correction target. Specifically, if "standard (initial value)" is specified, the target line width for lines with a width of 1 to 4 pixels is determined as 40 μm for a 1-pixel width line, 80 μm for a 2-pixel width line, 120 μm for a 3-pixel width line, and 160 μm for a 4-pixel width line. Then, the processing proceeds to step S402.

In step S402, the control unit 101 sets the printing conditions for printing the image data for measurement. Specifically, the control unit 101 performs a setting so that the image data for measurement will not be corrected by the line width correction processing unit 202. Then, the processing proceeds to step S403.

In step S403, the control unit 101 prints the image data for measurement (measurement chart image data) with the printing unit 104. The specific processing performed in this step will be described below.

Figure 8:
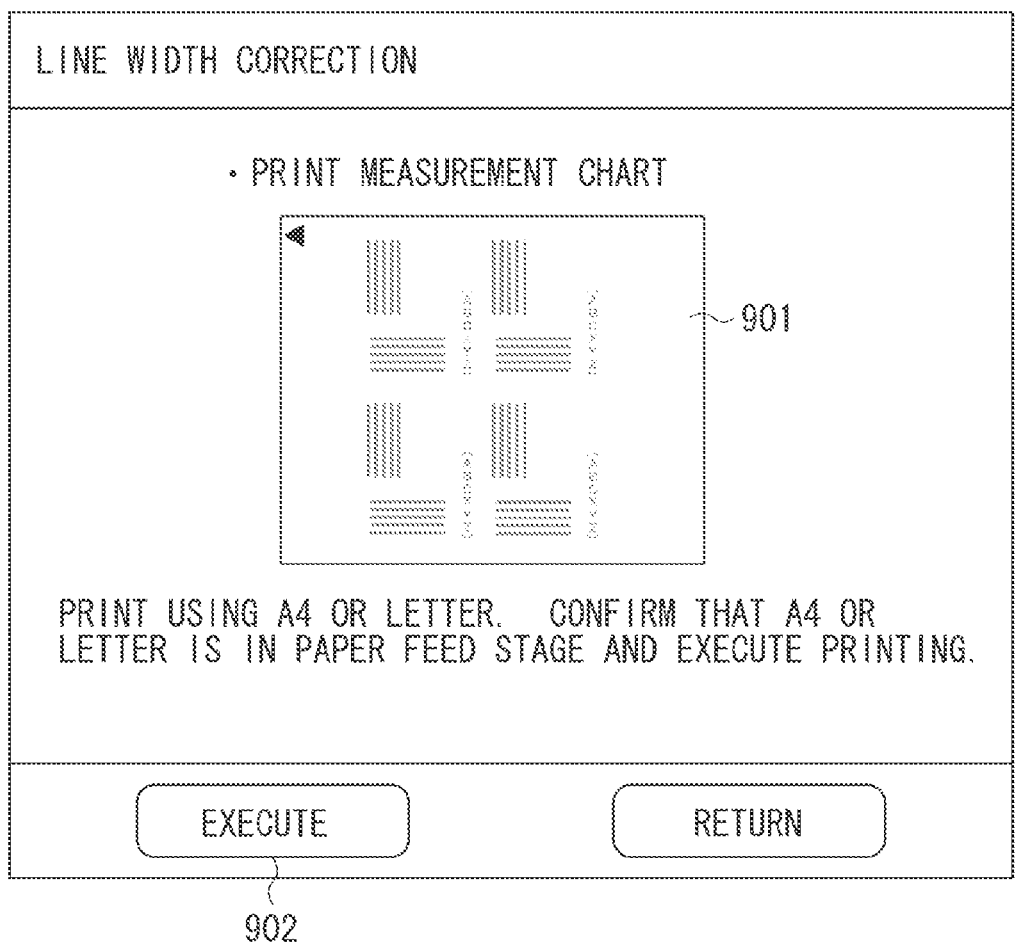
FIG. 8 illustrates an example of a print instruction screen of a measurement chart.

The control unit 101 causes the operation unit 105 to display a measurement target print instruction screen like that illustrated in FIG. 8. This measurement chart includes four types of line width, a 1-pixel width, a 2-pixel width, a 3-pixel width, and a 4-pixel width. If the user presses the "execute" button 902 on the print instruction screen illustrated in FIG. 8, the operation unit 105 detects that the button has been pressed, and sends that information to the control unit 101. Then, the control unit 101 starts the printing of the image data for measurement. Specifically, the control unit 101 reads the image data for measurement pre-stored in the storage unit 106, and sends the image data for measurement to the image processing unit 103. Then, the image processing unit 103 performs image processing on the received image data based on the printing conditions set in step S402, and outputs the processed image data to the printing unit 104 as image data for printing. Then, the printing unit 104 prints the image data for printing, and outputs the measurement chart. Then, the processing proceeds to step S404.

In step S404, the reading unit 102 reads the measurement chart.

Figure 9:
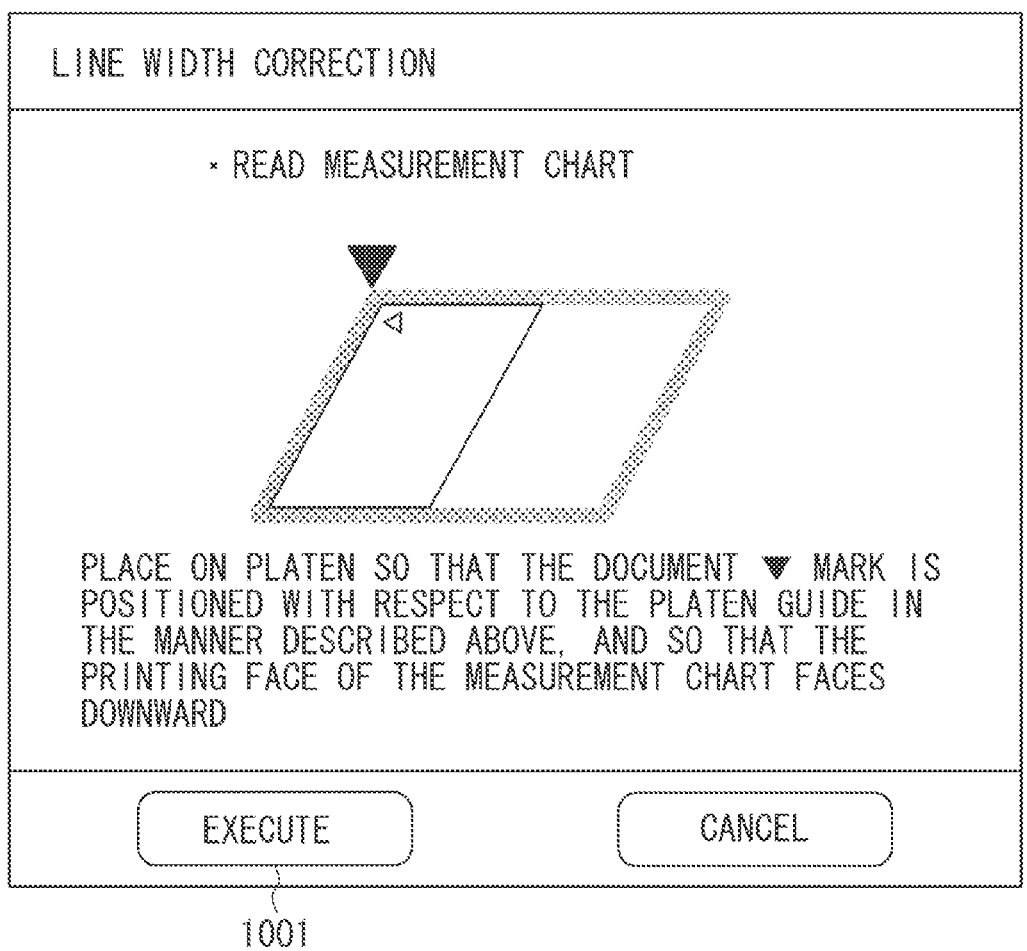
FIG. 9 illustrates an example of a reading instruction screen of a measurement chart.

Specifically, the control unit 101 causes the operation unit 105 to display a measurement chart reading instruction screen like that illustrated in FIG. 9. This instruction screen indicates to the user how to place the measurement chart with respect to the platen of the reading unit 102. If the reading unit 102 is performing reading based on automatic paper feeding, the vertical and horizontal directions of the reading face of the measurement chart may be shown to the user.

The user then places the measurement chart on the reading unit 102 facing in the correct direction, and presses the "execute" button 1001. The operation unit 105 detects the pressing of the "execute" button 1001, and sends information indicating that the button has been pressed to the control unit 101. Then, the control unit 101 issues an instruction to the reading unit 102 to execute reading of the measurement chart. Then, the processing proceeds to step S405.

In step S405, the control unit 101 stores the measurement chart image data (read image) read by the reading unit 102 in the storage unit 106, and the processing then proceeds to step S406.

In step S406, the control unit 101 performs line width correction value calculation processing (described below) using the measurement chart image data stored in step S405, and acquires the current line width (measurement line width) of the various pixel widths, a line width correction value for the lines with various pixel widths, and a corrected line width after line width correction. Then, the processing proceeds to step S407.

In step S407, the control unit 101 causes the operation unit 105 to display an application confirmation screen like that illustrated in FIG. 10, which shows the target line width determined in step S401 and the measurement line width and the corrected line width acquired in step S406. Then, the processing proceeds to step S408.

In step S408, the control unit 101 determines whether the "apply" button 1101 in FIG. 10 has been pressed.

Specifically, if the user presses the "apply" button 1101, the operation unit 105 detects the pressing of this button, and sends information indicating that the "apply" button 1101 has been pressed to the control unit 101. The control unit 101 receives this information, determines that the "apply" button 1101 has been pressed (YES in step S408), and the processing proceeds to step S409.

On the other hand, if the user presses the "not apply" button 1102, the operation unit 105 detects the pressing of this button, and sends information indicating that the "not apply" button 1102 has been pressed to the control unit 101. The control unit 101 receives this information, determines that the "apply" button 1101 has not been pressed (NO in step S408), and finishes the processing performed in this flowchart.

In step S409, the control unit 101 sets the line width correction value determined in step S406 for the line width correction processing unit 202. Then, the control unit 101 finishes the processing performed in this flowchart.

Figure 4:
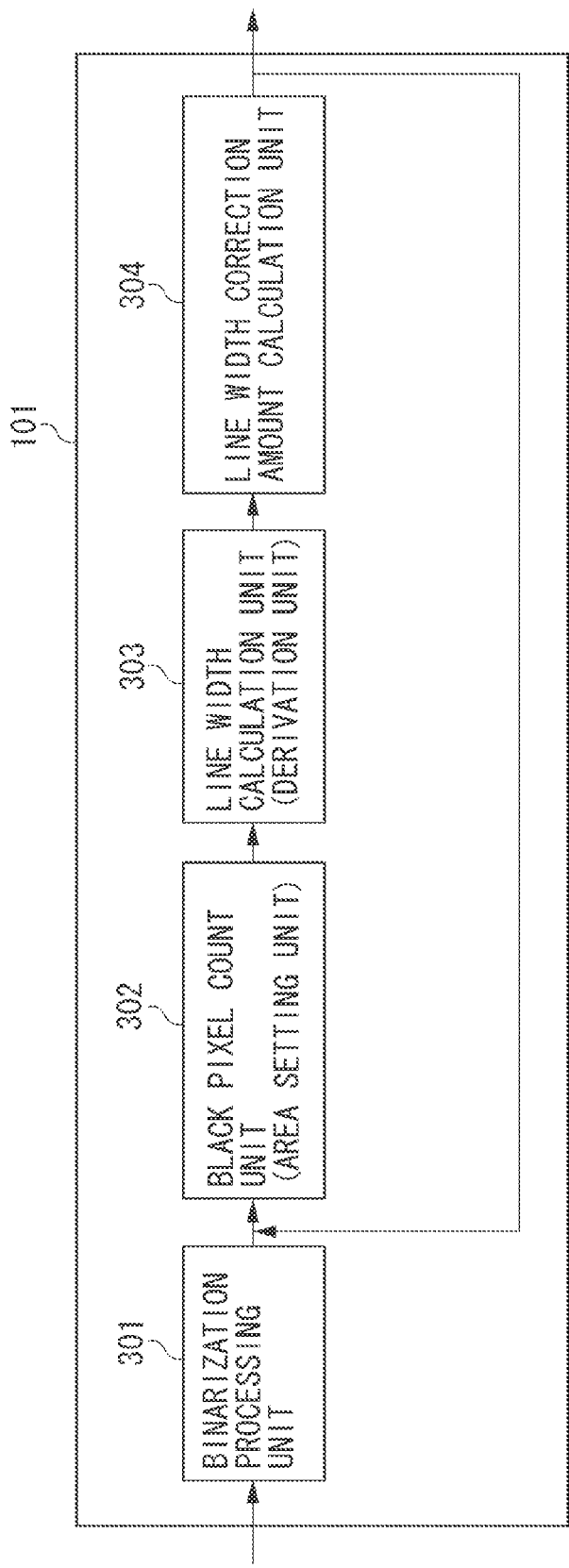
FIG. 4 is a block diagram of the processing modules executing line width correction value calculation processing.

The line width correction value calculation processing will now be described. FIG. 4 illustrates a configuration of the processing modules in the control unit 101 that execute the line width correction value calculation processing performed in step S406 of FIG. 3.

A binarization processing unit 301 performs binarization processing on the measurement chart image data stored in the storage unit 106, and converts the image portions corresponding to a printed line into black pixels and the image portions corresponding to the background into white pixels. Then, the binarization processing unit 301 sends the converted image data (binarization data) to a black pixel count unit 302.

This binarization processing is performed based on whether a pixel value (e.g., a luminance value) of the image data is equal to or more than a threshold. In the present exemplary embodiment, since the measurement chart image data is luminance data, the binarization processing unit 301 converts the pixels having a pixel value less than this threshold into black pixels, and the pixels having a pixel value equal to or more than this threshold into white pixels.

The black pixel count unit 302 counts the number of black pixels in a predetermined area in the binarization data (also called a binarization image), and sends the number of black pixels in the counted result to a line width calculation unit 303.

The line width calculation unit 303 calculates the line width (measurement line width) of the line printed in the measurement chart based on the number of black pixels counted by the black pixel count unit 302, and sends the measurement line width to a line width correction amount calculation unit 304.

The line width correction amount calculation unit 304 calculates the line width correction amount so that the lines having line widths of each pixel number have the target line widths based on the received measurement line width. Further, the line width correction amount calculation unit 304 determines the corrected line width when the measurement line width has been corrected using the calculated line width correction amount.

Figure 5:
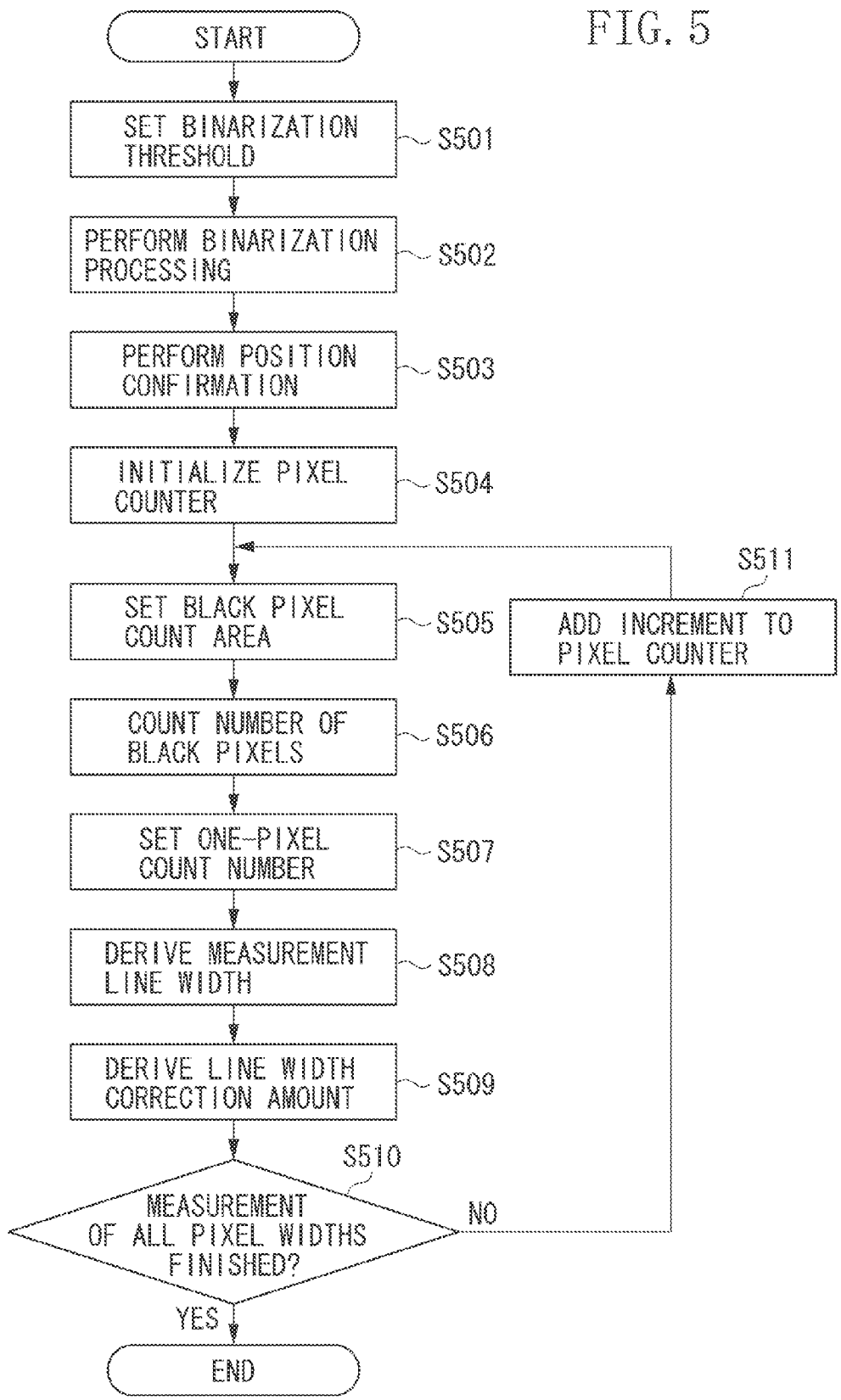
FIG. 5 is a flowchart illustrating a processing flow of line width correction value calculation processing.

The processing flow for the line width correction value calculation processing will now be described. FIG. 5 is a flowchart illustrating in detail the line width correction value calculation processing performed in step S406 of FIG. 3. Each of the steps in this flowchart is executed by the control unit 101 executing a program stored in the storage unit 106 that executes the processing of the flowchart in FIG. 5. Further, each of the steps in FIG. 5 is executed by the respective processing modules described based on FIG. 4. The flowchart of FIG. 5 will now be described.

In step S501, the binarization processing unit 301 sets the threshold for the binarization processing. The binarization threshold will be described with reference to FIGS. 11A and 11B.

Figure 11A:
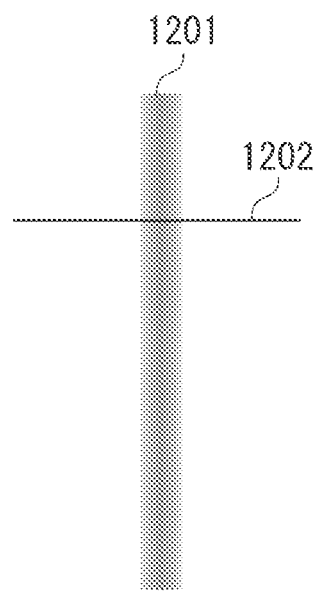
FIGS. 11A and 11B illustrate lines having different degrees of blur.
Figure 11B:
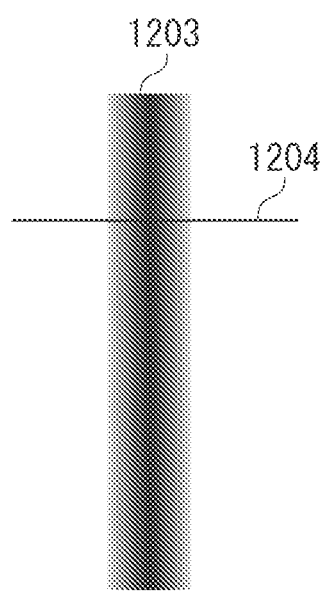
Figure 12A:
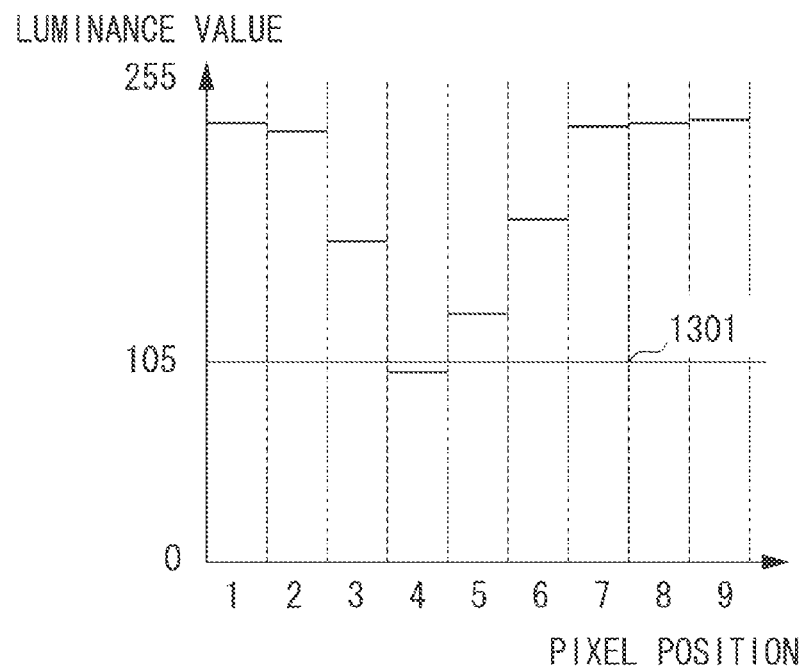
FIGS. 12A and 12B illustrate profiles of lines having different degrees of blur.

Fine line 1201 in FIG. 11A is an example of a 1-pixel width line that has a large degree of blur. Fine line 1203 in FIG. 11B is an example of a 2-pixel width line that has a smaller degree of blur than that of the fine line 1201. FIG. 12A illustrates a profile (the relationship between the luminance value read by the reading unit 102 and the pixel position on the straight line 1202) on the straight line 1202 of the fine line 1201. The luminance value at the pixel position on the straight line 1202 is indicated by a thick line. Similar to FIG. 12A, FIG. 12B illustrates a profile on the straight line 1204 of the fine line 1203 in FIG. 11B.

Figure 12B:
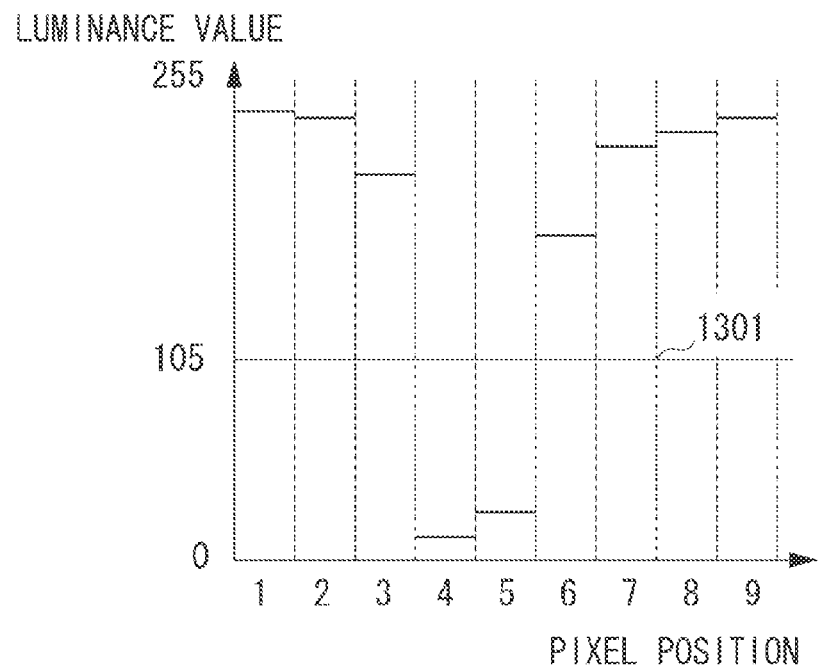

The binarization processing unit 301 sets "105" as the threshold 1301 illustrated in FIGS. 12A and 12B. However, this threshold is an example, which the present disclosure is not limited to.

In step S502, the binarization processing unit 301 performs binarization processing on the measurement chart image data using the threshold set in step S501.

Figure 13A:
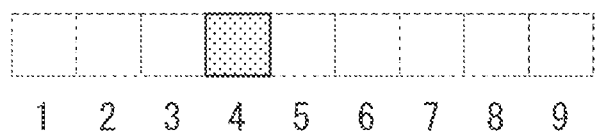
FIGS. 13A and 13B illustrate examples of binarization data.
Figure 13B:
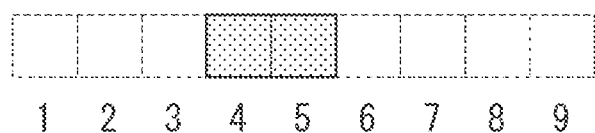

This processing will be described with reference to FIGS. 12A and 12B. In FIG. 12A, the pixels having a luminance value equal to or more than the threshold 1301 become white pixels, and the pixels having a luminance less than the threshold 1301 become black pixels. Specifically, the binarization data obtained after the binarization processing of the fine line 1201 on the straight line 1202 is converted into data like that illustrated in FIG. 13A, in which only the pixel at position 4 is a black pixel, and the remaining pixels are white pixels. Similarly, the binarization data obtained after the binarization processing of the fine line 1203 is converted into data like that illustrated in FIG. 13B, in which the pixels at positions 4 and 5 are black pixels, and the remaining pixels are white pixels. In FIGS. 13A and 13B, one block represents one pixel of the reading unit 102.

Therefore, the fine line 1201 with a 1-pixel width that has a large degree of blur is binarized into a 1-pixel width line, and the fine line 1203 with a 2-pixel width that has a smaller degree of blur than the fine line 1201 is binarized into a 2-pixel width line.

In step S503, the black pixel count unit 302 refers to the binarization data and performs position confirmation of the line to be measured. In the present exemplary embodiment, the black pixel count unit 302 performs position confirmation of a 4-pixel width line, which is the thickest line that can be reliably read. The position of the other pixel width lines to be measured can also be determined based on the position of the 4-pixel width line.

In step S504, since the black pixel count unit 302 repeats the measurement processing from the 1-pixel width line until the 4-pixel width line, initialization of the pixel counter n is performed. The pixel counter n indicates that the line to be measured is the n-pixel width line. Based on this initialization, first, measurement is performed from the 1-pixel width line at n=1. The pixel counter n is stored in the (not illustrated) RAM in the control unit 101, and is appropriately updated.

In step S505, the black pixel count unit 302 sets a count area (n) for counting the number of black pixels. Specifically, the black pixel count unit 302 functions as an area setting unit for setting an area with a size based on the line width of each of the lines for each of the lines in the binarization image.

Figure 14A:
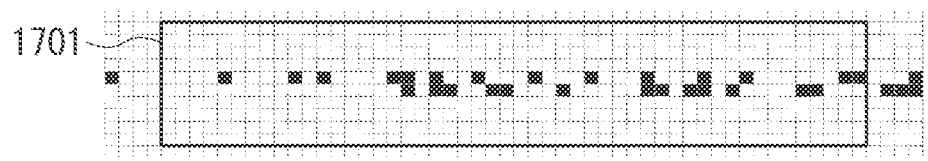
FIGS. 14A, 14B, 14C, and 14D illustrate examples of a black pixel count area.

More specifically, the black pixel count unit 302 sets a black pixel count area based on the respective pixel widths, like the areas illustrated in FIGS. 14A, 14B, 14C, and 14D. More specifically, for line width measurement of a 1-pixel width line, as illustrated in FIG. 14A, the black pixel count unit 302 sets a count area 1701 of 50×10 pixels, i.e., equivalent to 500 pixels. Further, for line width measurement of a 2-pixel width line, the black pixel count unit 302 sets a count area 1702 of 25×10 pixels, i.e., equivalent to 250 pixels. For line width measurement of a 3-pixel width line, the black pixel count unit 302 sets a count area 1703 of 25×10 pixels, i.e., equivalent to 250 pixels. For line width measurement of a 4-pixel width line, the black pixel count unit 302 sets a count area 1704 of 10×10 pixels, i.e., equivalent to 100 pixels.

As described above, the black pixel count unit 302 sets the count area to be larger the finer the pixel width of the line to be measured is, and the count area to be smaller the thicker the pixel width of the line is. Specifically, there is a first line and a second line printed in the printing chart. In this case, if the line width of the first line (first line width) is finer than the line width of the second line (second line width), the black pixel count area set by the black pixel count unit 302 for the first line is larger than the black pixel count area set by the black pixel count unit 302 for the second line.

Further, the size of the count areas set by the black pixel count unit 302 changes in the extension direction of the line for which an attempt to measure the line pixel width (line width) is being made. This is performed to reduce the effect of line blur that can occur for a 1-pixel width line.

The effects caused by differences in the degree of blur will now be described.

For the fine line 1201 illustrated in FIG. 11A, the difference between the darkest portion and the threshold is small, but for the fine line 1203 illustrated in FIG. 11B, the difference between the darkest portion and the threshold is large. Specifically, for the fine line 1201, which has a large degree of blur, since the darkest portion varies between being less than or more than the threshold depending on the position on the line (position in the vertical direction in FIGS. 11A and 11B), the pixels are not fixed in the line (FIG. 11A), being either black pixels or white pixels based on whether the darkest portion is more than or less than the threshold.

Consequently, as illustrated in FIG. 14A, even for a line that has been appropriately subjected to black pixelation in the middle portion, the number of black pixels on the left portion is very small in the binarization data of the 1-pixel width line due to the effects of the binarization threshold and blur. Therefore, for example, as the 1-pixel width count area, if the 4-pixel width count area 1704 is applied, only two black pixels are detected.

In the latter stage processing, since the number of counted black pixels are made to correspond to the line width, if the number of black pixels is low, the measurement line width is recognized to be smaller than necessary, so that the accuracy of the automatic correction deteriorates. Therefore, by increasing the count area (1) of the 1-pixel width line, the effects of the binarization threshold and blur are reduced. For a line having a low degree of blur, the darkest position regardless of the position on the line tends to be smaller than the threshold, and thus tends to become a black pixel. Consequently, when measuring a line with a wide pixel width, there is no problem even if the count area is set smaller than the count area (1).

For example, the 4-pixel width count area (4) is set to be smaller than the 1-pixel width line count area (1). By thus making the count area smaller, the processing time taken to count the number of black pixels can be reduced.

The count area (n) for the respective pixel widths illustrated in FIGS. 14A, 14B, 14C, and 14D are set so that the line whose line width is to be measured is in the center of the count area (n), and so as not to include the line end portions.

In step S506, the black pixel count unit 302 counts the number of black pixels in the count area (n) set in step S505 to determine a black pixel count BK (n). In this step, the black pixel count unit 302 functions as a counting unit for counting the number of black pixels.

Figure 14B:
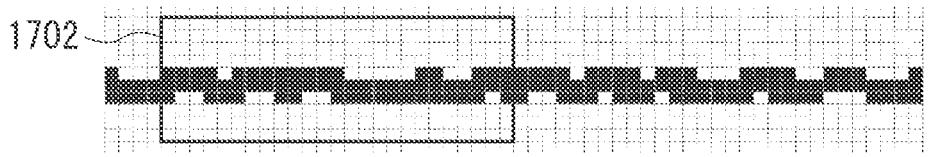
Figure 14C:
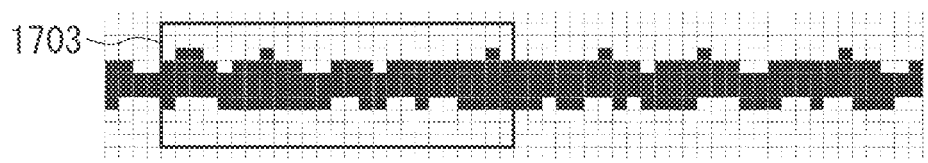
Figure 14D:
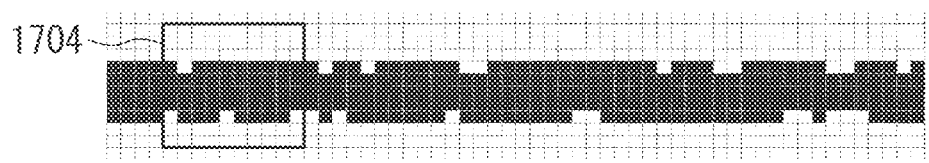

In the example of FIG. 14A, the black pixel count BK (1) in the area 1701, which is the count area (1) for a 1-pixel width line, is 27. In the example of FIG. 14B, the black pixel count BK (2) in the area 1702, which is the count area (2) for a 2-pixel width line, is 60. In the example of FIG. 14C, the black pixel count BK (3) in the area 1703, which is the count area (3) for a 3-pixel width line, is 91. In the example of FIG. 14D, the black pixel count BK (4) in the area 1704, which is the count area (4) for a 4-pixel width line, is 46.

In step S507, if an ideal 1-pixel width line is to be read, the line width calculation unit 303 sets the number of black pixels to be counted (1-pixel count C (n)) in the count area (n) set in step S505. This 1-pixel count C (n) is pre-stored in the storage unit 106, and is called up and used by the line width calculation unit 303.

Specifically, the line width is expressed as a number of pixels by dividing the black pixel count BK (n) in the count area (n) of an n-pixel width line by the 1-pixel count C (n). FIGS. 15A, 15B, 15C, and 15D illustrate how an ideal 1-pixel width line is read at each pixel width count area (n).

Figure 15A:
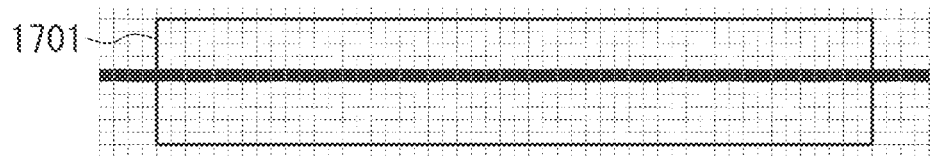
FIGS. 15A, 15B, 15C, and 15D illustrate examples of ideal 1-pixel width lines in a black pixel count area.
Figure 15B:
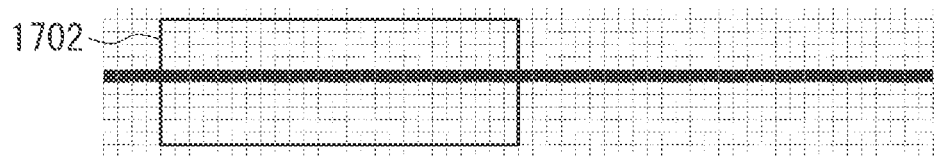
Figure 15C:
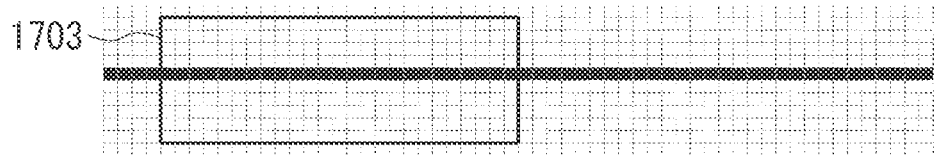
Figure 15D:
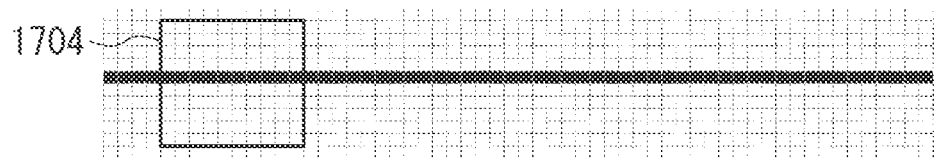

In FIG. 15A, the 1-pixel count C (1) in the count area (1) for counting an ideal 1-pixel width line is 50. The 1-pixel count C (2) in the count area (2) for counting an ideal 1-pixel width line is 25. The 1-pixel count C (3) in the count area (3) for counting an ideal 1-pixel width line is 25. The 1-pixel count C (4) in the count area (4) for counting an ideal 1-pixel width line is 10.

In step S508, the line width calculation unit 303 calculates the measurement line width using the 1-pixel count C (n) corresponding to the n-pixel width line and the black pixel count BK (n) in the count area (n). Specifically, in this step, the line width calculation unit 303 functions as a derivation unit for deriving the line width of the lines on a printed product based on a number of black pixels counted by the black pixel count unit 302.

More specifically, the line width calculation unit 303, first, determines the measurement pixel width Wp (n) for each line width based on the following equation (1).

$$Wp(n)=BK(n)/C(n) \quad \text{(Equation 1)}$$

Next, based on the print resolution of the printing unit 104, the measurement line width W (n) is calculated from the measurement pixel width Wp (n). For example, if the print resolution is 600 dpi, since one pixel at 600 dpi is 40 μm, the line width calculation unit 303 converts the line width expressed by the measurement pixel width Wp (n) from pixel units into μm units using the following equation (2).

$$W(n)=Wp(n) \times 40 \quad \text{(Equation 2)}$$

In the examples illustrated in FIGS. 14A, 14B, 14C, and 14D, the 1-pixel width measurement line width W (1) is calculated as 22 μm, the 2-pixel width measurement line width W (2) as 96 μm, the 3-pixel width measurement line width W (3) as 146 μm, and the 4-pixel width measurement line width W (4) as 184 μm.

In step S509, the line width correction amount calculation unit 304 calculates a line width correction amount Wc (n) of the lines with respective pixel widths from the measurement line width W (n) and the target line width Wt (n) based on the following equation (3). Wt (n) is expressed in μm units.

$$Wc(n)=Wt(n)-W(n) \quad \text{(Equation 3)}$$

In the present exemplary embodiment, since the line width correction by the line width correction processing unit 202 is performed in 0.5 pixel width units at 600 dpi, based on the following equation (4), the line width correction amount Wc (n) is converted into a correction level Lc (n) of 0.5 pixel units. Further, since one pixel is 40 μm, half a pixel is 20 μm. This Lc (n) is a value obtained by rounding off the places after the decimal point that is produced by the calculation of the right-hand side in equation (4).

$$Lc(n)=Wc(n)/20 \quad \text{(Equation 4)}$$

An example of the line width correction performed by the line width correction processing unit 202 using the correction level Lc (n) will now be described with reference to FIG. 18. FIGS. 18A, 18B, 18D, and 18E illustrate, in order, images obtained by correcting the line width of an image with the lines illustrated in FIG. 18C based on the correction level Lc (n) value. FIGS. 18A, 18B, 18D, and 18E illustrate, in order, images with lines at a correction level of −2 that are finer by 1 pixel (=0.5×2), lines at a correction level of −1 that are finer by 0.5 pixels (=0.5×1), lines at a correction level of +1 that are thicker by 0.5 pixels (=0.5×1), and lines at a correction level of +2 that are thicker by 1 pixel (=0.5×2).

Figure 18A:
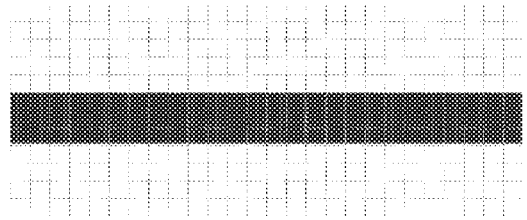
FIGS. 18A, 18B, 18C, 18D, and 18E illustrate examples of line width correction based on a correction level.
Figure 18B:
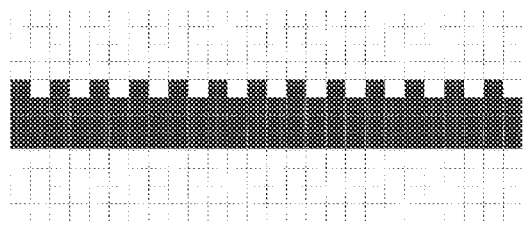
Figure 18C:
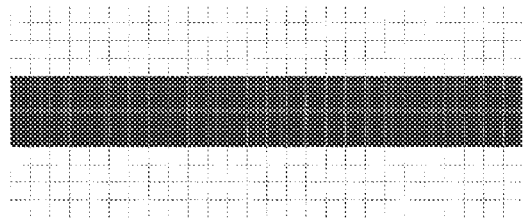
Figure 18D:
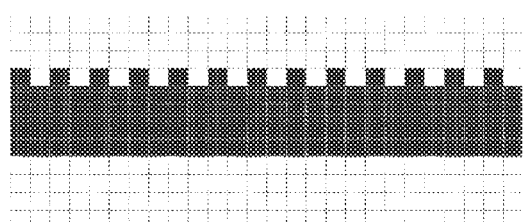
Figure 18E:
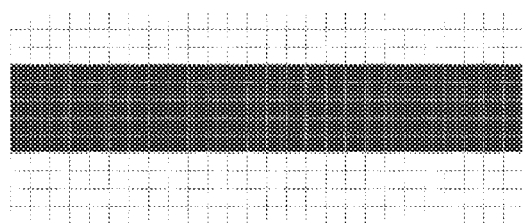

The correction for making the lines finer or thicker by 1 pixel is performed, as illustrated in FIGS. 18A and 18E, by thinning or adding a one pixel amount to all the pixels on one side of the image portions indicating a line to the image with the lines illustrated in FIG. 18C, which is the input image.

The correction for making the lines finer or thicker by 0.5 pixels is performed, as illustrated in FIGS. 18B and 18D, by thinning or adding one pixel to every second pixel on one side of the image portions indicating a line to the image with the lines illustrated in FIG. 18C, which is the input image. Further, the line width correction amount calculation unit 304 determines the corrected line width Wa (n) after line width correction using the following equation (5) from the measurement line width W (n) and the correction level Lc (n).

$$Wa(n)=W(n)+Lc(n) \times 20 \quad \text{(Equation 5)}$$

Consequently, the processing of step S509 is finished, so the processing proceeds to step S510.

In step S510, the line width correction amount calculation unit 304 determines whether the automatic correction of each pixel width has finished. Specifically, the line width correction amount calculation unit 304 determines whether the pixel counter n stored in the RAM is a value indicating the maximum pixel width among the line widths to be corrected. In the present exemplary embodiment, the line width correction amount calculation unit 304 determines whether the pixel counter n is "n=4". If it is determined that "n=4" (YES in step S510), the processing performed in this flowchart is finished. If it is not determined that "n=4" (NO in step S510), the processing proceeds to step S511.

In step S511, the line width correction amount calculation unit 304 increases the pixel counter n stored in the RAM by an increment of one.

The above was a detailed description of the line width correction value calculation processing performed in step S406 of FIG. 3.

FIG. 16 is a table illustrating the line width correction value calculation processing according to the present exemplary embodiment. In the table, information about the target line width of each pixel width, the measurement line width, and the corrected line width is displayed on the screen illustrated in FIG. 10 based on the above-described processing performed in step S407.

Figure 17:
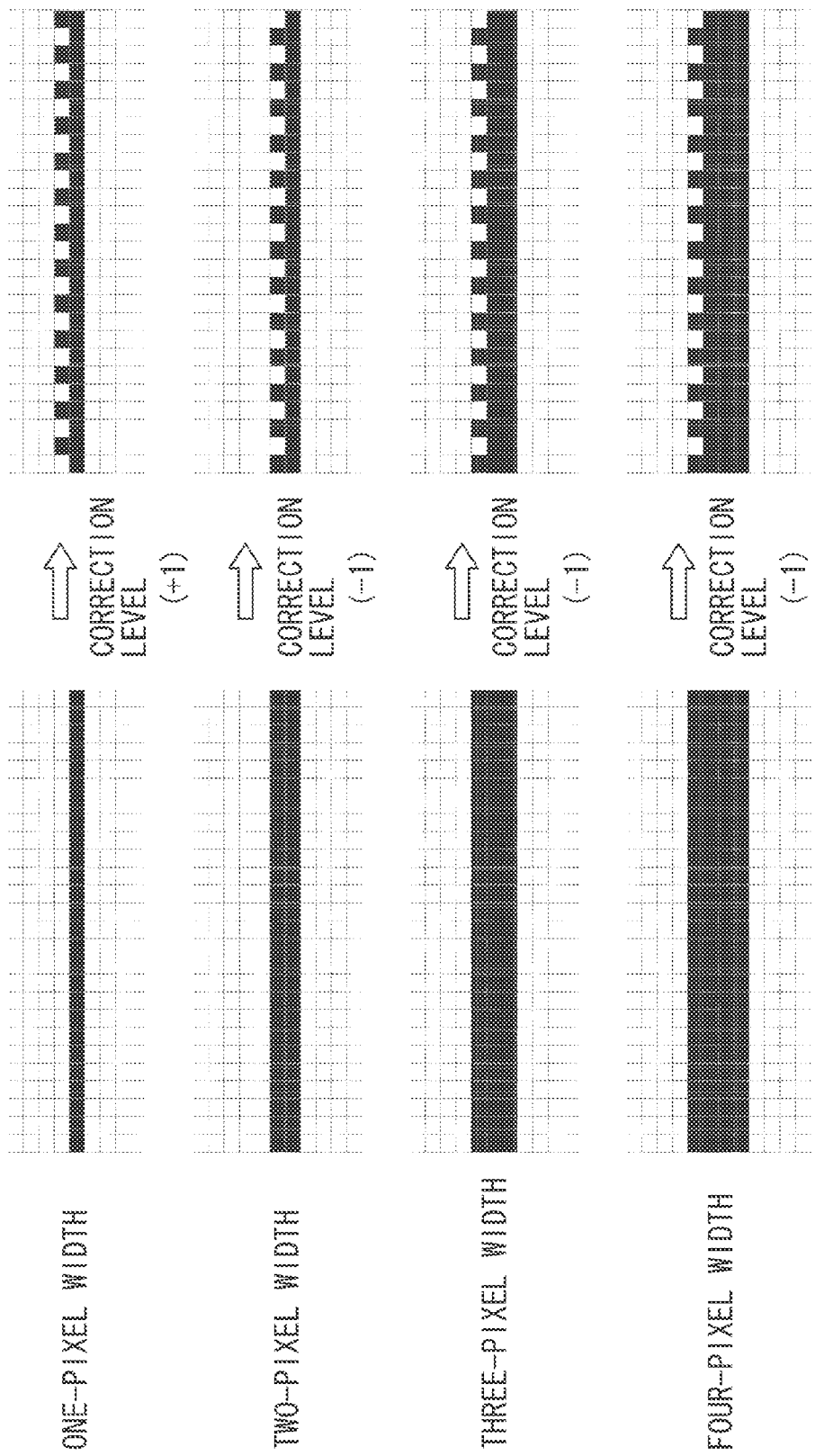
FIG. 17 illustrates an example of line width correction based on various data determined by line width correction value calculation processing.

FIG. 17 illustrates how line width correction processing looks when performed based on the information illustrated in FIG. 16. Specifically, the line width correction processing unit 202 generates corrected image data (refer to the right side of FIG. 17) by performing line width correction on image data input as illustrated in FIG. 17 (refer to the left side of FIG. 17). More specifically, in the present exemplary embodiment, as illustrated in FIG. 16, corrected image data is generated by performing line width correction at a correction level of (+1) on input image data of lines having a 1-pixel width. Similarly, for the input image data of lines having a 2-pixel width to 4-pixel width too, line width correction is performed based on the correction levels illustrated in FIG. 16.

Thus, according to the present exemplary embodiment, by changing the size of the count area based on the line width of the line whose line width is to be measured, line width can be measured even for fine lines that have a greater degree of blur, so that line width correction can be appropriately performed. The size of the count area may be set so as to gradually increase the finer the line width of the line to be measured becomes, or set so as to increase in steps.

In the present exemplary embodiment, automatic correction of line width up to a 4-pixel width was described using a line width chart output by the printing unit 104 at a printer resolution of 600 dpi. However, the present disclosure is not limited to automatic correction of line width up to a 4-pixel width. For example, the target pixel width of the line on which automatic correction is to be performed may be determined based on the characteristics of the printing unit 104 and the print resolution.

Further, the present exemplary embodiment dynamically changes the black pixel count area based on the line width to be measured. Consequently, when measuring the line width of a line having a thick pixel width, the count area can be narrower than when measuring a line having a fine pixel width, so that the processing time for the black pixel count processing can be shortened.

A second exemplary embodiment will now be described. In the first exemplary embodiment, the sheet used in printing is high-quality paper. However, as a type of sheet there is recycled paper other than high-quality paper. Although high-quality paper has higher sheet surface smoothness than recycled paper, and also has high reproducibility of the lines to be printed, recycled paper has lower sheet surface smoothness than high-quality paper, and lower reproducibility of the lines to be printed than high-quality paper.

The influence of reproducibility will now be described in detail.

Figure 19:
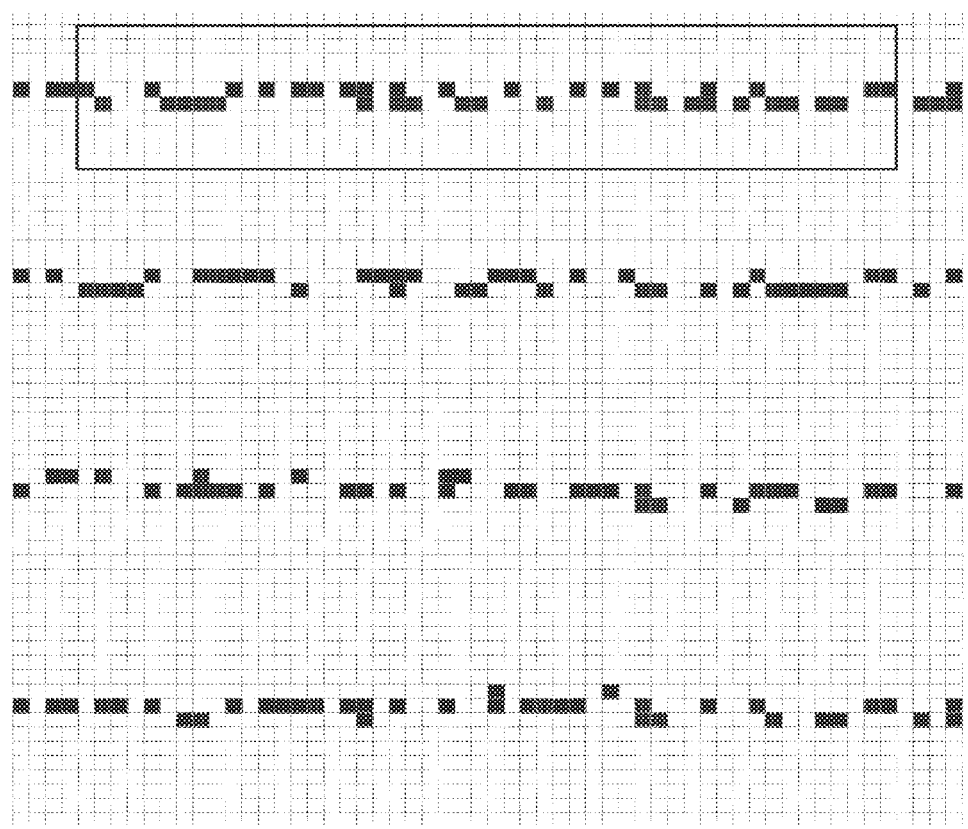
FIG. 19 illustrates an example of binarization data and a black pixel count area in a measurement chart using high-quality paper.
Figure 20:
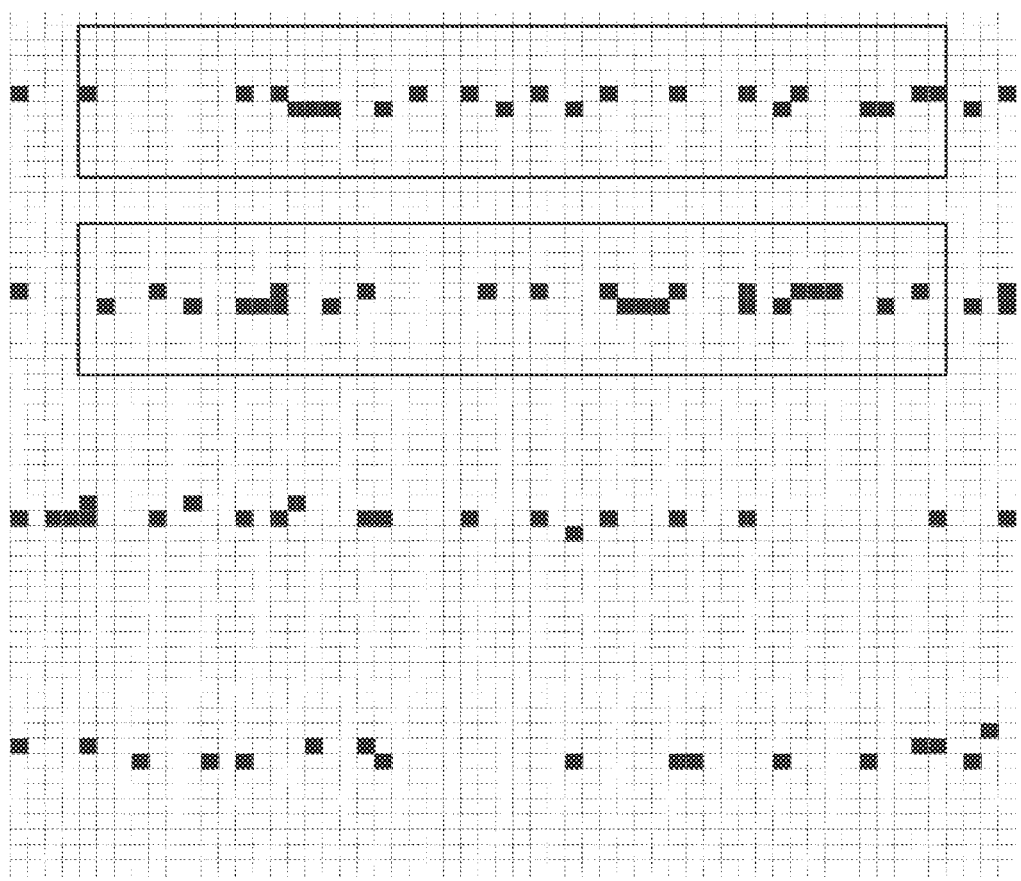
FIG. 20 illustrates an example of binarization data and a black pixel count area in a measurement chart using recycled paper.

If four 1-pixel width lines printed on high-quality paper are read by the reading unit 102 and binarized as described in the first exemplary embodiment, as illustrated in FIG. 19, all of the lines are subjected to black pixelation in roughly the same manner. However, for recycled paper, as illustrated in FIG. 20, the positions subjected to black pixelation based on binarization are different for each of the four 1-pixel width lines.

Therefore, in the present exemplary embodiment, the number of black pixels is counted by changing the size of the black pixel count area based on the type of sheet.

A characteristic of the present exemplary embodiment is that the size of the area set by the black pixel count unit 302 in step S305 is changed based on the type of sheet to be used in printing. Therefore the other features are assumed to be the same as the first exemplary embodiment, and a description thereof is omitted here.

In the present exemplary embodiment, the printing unit 104 outputs four lines of each pixel width when outputting the measurement chart.

The black pixel count unit 302 according to the present exemplary embodiment will now be described.

The black pixel count unit 302 acquires information about the type of sheet to be used in the measurement chart based on a user instruction via the operation unit 105. In this case, in step S401 and the like, the operation unit 105 displays a screen that allows the user to specify the type of sheet to be used in the measurement chart. Alternatively, the information about the type of sheet can be acquired from the setting information relating to the types of sheet that are stored in a (not illustrated) paper feed stage.

In step S505, if information has been acquired that indicates a sheet type with a high surface smoothness (e.g., high-quality paper), as illustrated in FIG. 19, the black pixel count unit 302 sets a black pixel count area for one of the four lines of each pixel width.

On the other hand, in step S505, if information has been acquired that indicates a sheet type with a low surface smoothness (e.g., recycled paper), as illustrated in FIG. 20, the black pixel count unit 302 sets a black pixel count area for two of the four lines of each pixel width.

Then, in step S506, the black pixel count unit 302 counts the number of black pixels in the set count areas in the same manner as in the first exemplary embodiment.

Thus, when there is a plurality of types of sheet with different sheet surface smoothness, and a certain sheet type (first type) has a lower sheet surface smoothness than an another type of sheet (second type), the count area set when using the first sheet type is set to be larger than the area set when using the second sheet type.

By setting in this manner, in the present exemplary embodiment, unevenness in the black pixel count that is based on the smoothness of the sheet surface can be suppressed, and fluctuation in the measurement accuracy of the line width can be suppressed.

Figure 21:
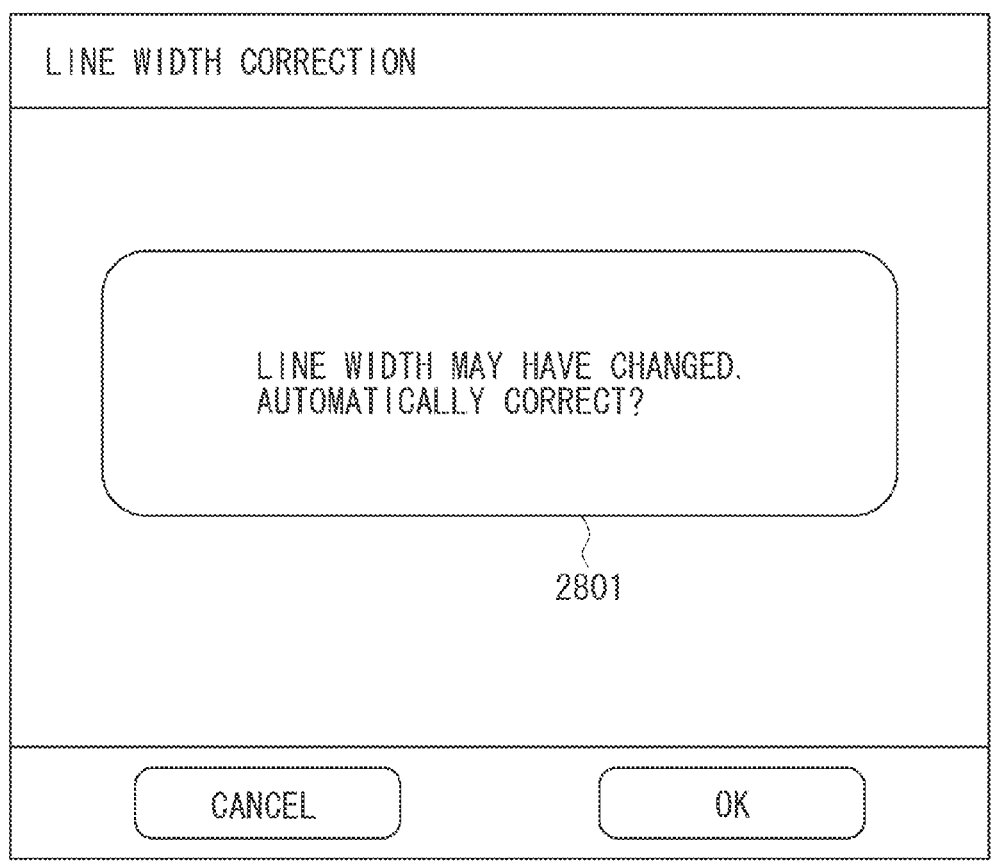
FIG. 21 illustrates an example of a screen prompting a user to perform automatic line width processing.

Thus, if the smoothness of the sheet surface changes, the line width can also change. Therefore, when the sheet selection is changed by the user, a screen like that illustrated in FIG. 21 is displayed on the operation unit 105 to prompt the user to perform automatic correction of the line width, so that line width can be maintained at a constant level regardless of the paper.

A third exemplary embodiment will now be described. In an electrophotography, dot reproduction of the toner can change when the number of sheets printed by the printing unit 104 increases, which can even cause the thickness of fine lines to change. For example, if the cumulative number of sheets printed by the printing unit 104 approaches the number at which it is thought that parts such as the transfer parts in the printing unit 104 need to be replaced, the transfer efficiency of the toner onto the paper deteriorates. Consequently, the dot reproducibility on the sheets deteriorates, so that the fine lines tend to blur and become finer.

Accordingly, in the present exemplary embodiment, the setting of the size for the black pixel count area is changed based on a process condition of the printing unit 104 that changes over time and influences line width. The difference between the present exemplary embodiment and the second exemplary embodiment is the information referenced when changing the setting of the count area size. Other features are the same as the second exemplary embodiment. Specifically, although in the second exemplary embodiment the size of the count area is changed based on the sheet type, in the present exemplary embodiment, the size of the count area is changed based on the cumulative number of sheets of a printed product printed by the printing unit 104.

More specifically, if the cumulative number of sheets of a printed product printed by the printing unit 104 exceeds a predetermined number, the black pixel count unit 302 according to the present exemplary embodiment sets the size of the count area to be even larger than it had been until that point.

By setting in this manner, line width measurement is possible that suppresses unevenness in the counted number of black pixels based on fluctuations in the reproducibility of fine lines due to an increase in the cumulative number of sheets printed.

The size of the count area may be set so as to gradually increase the finer the line width of the line to be measured becomes, or set so as to increase in steps.

Other exemplary embodiments will now be described. The image processing apparatus according to the above exemplary embodiments may further include a feature for prompting the user to perform automatic line width correction.

For example, if the fact that the type of sheet stored in a (not illustrated) paper feed stage has changed is detected based on a user instruction, there is a chance that the line width of the lines to be printed on the sheet will change. In this case, the apparatus may be configured so that the control unit 101 displays a screen like that illustrated in FIG. 21 on the operation unit 105 to prompt the user to perform automatic correction of line width.

For example, if the cumulative number of sheets of a printed product since the previous automatic correction of line width exceeds a fixed value or if a part configuring the printing unit 104 is replaced, the control unit 101 displays a screen like that illustrated in FIG. 21 on the operation unit 105 to prompt the user to perform automatic correction of line width.

By configuring in such a manner, the user can be notified of the timing that line width automatic correction should be performed, so that line width automatic correction can be performed at an effective timing based on a user instruction.

Further, if the reading unit 102 reading the measurement chart lies midway along the conveyance path of the measurement chart in the MFP 100, a screen like that illustrated in FIG. 21 may be automatically displayed on the operation unit 105, without having to prompt the user to perform automatic correction of line width.

In addition, although the line width correction value calculation processing in the above exemplary embodiments is performed by the control unit 101 executing a computer program stored in the storage unit 106, this processing may also be realized by providing a hardware circuit for performing the various processes performed in the above-described line width correction value calculation processing.

Other Embodiments

Aspects of the present disclosure can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-277324 filed Dec. 19, 2011, which is hereby incorporated by reference herein in its entirety.

What is claimed is:

1. An image processing apparatus comprising:
a printing unit configured to print an image with lines having a first line width and an image with lines having a second line width on a sheet, and output a printed product;
a reading unit configured to acquire a read image by reading the printed product;
a binarization unit configured to generate a binarization image by performing black pixelation on pixels corresponding to each of the lines in the read image by performing binarization processing on the read image using a predetermined threshold;
an area setting unit configured to set an area with a size based on the line width of each of the lines for each of the lines in the binarization image;
a counting unit configured to count a number of black pixels corresponding to each of the lines in the binarization image in the area set for each of the line widths; and
a derivation unit configured to derive the line width of the lines on the printed product based on the number of black pixels counted by the counting unit,
wherein in a case where the first line width is finer than the second line width, the size of the area set for the first line width by the area setting unit is larger than the size of the area set for the second line width by the area setting unit.

2. The image processing apparatus according to claim 1, wherein the area setting unit is configured to increase the area to be set in an extension direction of the lines.

3. The image processing apparatus according to claim 1, wherein the sheet includes a plurality of types of the sheet with regard to sheet surface smoothness, and
wherein the area setting unit is configured to change the size of the area based on the type of the sheet to be used for the printed product.

4. The image processing apparatus according to claim 3, wherein the sheet includes a first type and a second type whose smoothness is less than the smoothness of the first type, and
wherein the area setting unit is configured, in a case where the sheet type is the second type, to set the area to be set larger than in a case where the sheet type is the first type.

5. An image processing apparatus comprising:
an area setting unit configured, for an image obtained by reading a printed product in which a first line and a second line are printed, to set an area of a size that includes the lines based on a line width of the lines;
a counting unit configured to count a number of pixels in the lines in the area set in the image; and
a derivation unit configured to derive the line width of the lines based on the number of pixels counted by the counting unit,
wherein in a case where the line width of the first line is finer than the line width of the second line, the area including the first line set by the area setting unit is set to be larger than the area including the second line set by the area setting unit.

6. An image processing method comprising:
printing an image with lines having a first line width and an image with lines having a second line width on a sheet, and outputting a printed product;
performing reading of acquiring a read image by reading the printed product;
performing binarization of generating a binarization image by performing black pixelation on pixels corresponding to each of the lines in the read image by performing binarization processing on the read image using a predetermined threshold;
setting an area with a size based on the line width of each of the lines for each of the lines in the binarization image;
counting a number of black pixels corresponding to each of the lines in the binarization image in the area set for each of the line widths; and
deriving the line width of the lines on the printed product based on the counted number of black pixels,
wherein in a case where the first line width is finer than the second line width, the size of the area set for the first line width by the area setting is larger than the size of the area set for the second line width by the area setting.

7. A non-transitory storage medium storing a program for executing an image processing method, the image processing method comprising:
printing an image with lines having a first line width and an image with lines having a second line width on a sheet, and outputting a printed product;
acquiring a read image by reading the printed product;
generating a binarization image by performing black pixelation on pixels corresponding to each of the lines in the read image by performing binarization processing on the read image using a predetermined threshold;
setting an area with a size based on the line width of each of the lines for each of the lines in the binarization image;
counting a number of black pixels corresponding to each of the lines in the binarization image in the area set for each of the line widths; and
deriving the line width of the lines on the printed product based on the number of black pixels counted in the counting step,
wherein in a case where the first line width is finer than the second line width, the size of the area set for the first line width by the area setting is larger than the size of the area set for the second line width by the area setting.

* * * * *